(12) United States Patent
Miyazawa et al.

(10) Patent No.: US 6,969,951 B1
(45) Date of Patent: Nov. 29, 2005

(54) HIGH PRESSURE DISCHARGE VESSEL FOR AN ALUMINA HIGH-INTENSITY DISCHARGE LAMP

(75) Inventors: Sugio Miyazawa, Nagoya (JP); Michio Asai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 47 days.

(21) Appl. No.: 09/857,540

(22) PCT Filed: Oct. 12, 2000

(86) PCT No.: PCT/JP00/07086

§ 371 (c)(1),
(2), (4) Date: Jul. 23, 2001

(87) PCT Pub. No.: WO01/27966

PCT Pub. Date: Apr. 19, 2001

(30) Foreign Application Priority Data

Oct. 15, 1999 (JP) .................................. 11-294180
Oct. 5, 2000 (JP) ............................. 2000-306641

(51) Int. Cl.[7] .......................... H01J 17/04; H01J 61/04
(52) U.S. Cl. ...................................... 313/634; 313/623
(58) Field of Search ............................... 313/634–636, 313/623–625; 445/22, 26–27

(56) References Cited

U.S. PATENT DOCUMENTS

| 4,285,732 | A | * | 8/1981 | Charles et al. ............... 501/101 |
| 5,424,609 | A | * | 6/1995 | Geven et al. ................ 313/623 |
| 5,426,343 | A | * | 6/1995 | Rhodes et al. ............... 313/623 |
| 5,592,049 | A | * | 1/1997 | Heider et al. ................ 313/625 |
| 5,625,256 | A |   | 4/1997 | Tiedt et al. |
| 5,683,949 | A | * | 11/1997 | Scott et al. .................... 501/86 |
| 5,861,714 | A | * | 1/1999 | Wei et al. .................... 313/625 |
| 6,004,503 | A | * | 12/1999 | Neil ............................ 264/632 |
| 6,020,685 | A | * | 2/2000 | Wei et al. .................... 313/625 |
| 6,126,889 | A | * | 10/2000 | Scott et al. .................. 264/632 |
| 6,169,366 | B1 | * | 1/2001 | Niimi ........................... 313/633 |
| 6,259,205 | B1 | * | 7/2001 | Wijenberg et al. ........... 313/625 |
| 6,392,345 | B1 | * | 5/2002 | Niimi et al. .................. 313/623 |
| 6,525,475 | B2 | * | 2/2003 | Scholz et al. ................ 313/625 |
| 6,635,993 | B1 | * | 10/2003 | Niimi .......................... 313/623 |

FOREIGN PATENT DOCUMENTS

| CN | 1110003 A | 10/1995 |
| JP | 8-17396 | 1/1996 |
| JP | 10-188893 | 7/1998 |

* cited by examiner

Primary Examiner—Joseph Williams
Assistant Examiner—Dalei Dong
(74) Attorney, Agent, or Firm—Burr & Brown

(57) ABSTRACT

A discharge vessel or chamber for a high-intensity discharge lamp is provided, including a central body having a discharge space provided therein, two capillaries closing off respective end openings of the central body and an electrode positioned within each respective one of the capillaries. The central body and the capillaries comprise an alumina material or an alumina-based ceramic material. An average diameter of alumina grains in the central body is greater than an average diameter of alumina grains in the capillaries, and the average diameter of alumina grains in the capillaries is in a range of 10 $\mu$m to 25 $\mu$m.

10 Claims, 3 Drawing Sheets

FIG. 6 - PRIOR ART

HIGH PRESSURE DISCHARGE VESSEL FOR AN ALUMINA HIGH-INTENSITY DISCHARGE LAMP

BACKGROUND OF THE INVENTION

1. Field of the Invention

The present invention relates to a discharge vessel or chamber for a high-intensity discharge lamp and particularly, to a discharge vessel or chamber having a capillary at each end thereof for holding an electrode and a method of fabricating the same.

2. Description of Related Art

Ceramic discharge vessels or chambers for high-intensity discharge lamps are generally classified as either an integral type where the central body defining a discharge space and a capillary for holding an electrode are integrally formed with each other, or an assembly type, wherein the body and the capillary are separately fabricated as two different components and assembled together. In either type, as shown in the explanatory cross sectional view of FIG. 6, an electrode fabricated by an electrode material 12 with a discharge electrode 14 made of tungsten or the like joining to the distal end of a current conductor 13 made of niobium, molybdenum, or the like inserted into capillary 11 made of an alumina based ceramic material or an alumina material before the gap between the electrode and the capillary is sealed air-tightly with a frit sealer 15 made of a glass material.

The discharge vessel or chamber is then baked at its body and capillary simultaneously at a proper temperature.

As the discharge vessel or chamber of such a conventional capillary type is baked at a high temperature for increasing the permeability of light across its body, the physical strength tends to decline. In particular, when the capillary is joined and sealed with the electrode, it may possibly crack. It is hence essential for preventing any cracks to control the frit sealer to a precise amount and increase the thickness or physical strength of the capillary.

However, controlling the amount of the frit sealer requires a highly precise technique while increasing the thickness of the capillary interrupts the down-sizing of a resultant discharge lamp.

It is thus an object of the present invention, in view of the above aspects, to provide a discharge vessel or chamber for a high-intensity discharge lamp capable of inhibiting crack generation without controlling the frit sealer to a precise amount or increasing the thickness of the capillary and a method of fabricating the same.

SUMMARY OF THE INVENTION

We, the inventors, have studied the sintering characteristics of a ceramic where the diameter of grains in the ceramic becomes greater at higher sintering temperatures, thus decreasing the physical strength and where the diameter of grains in the ceramic becomes smaller at lower sintering temperatures, thus increasing the physical strength. As a result, an improved discharge vessel or chamber of a capillary type was developed which minimized the generation of cracks. According to the present invention, a discharge vessel or chamber for a high-intensity discharge lamp having a central body arranged providing a discharge space therein and two capillaries provided for closing off both end openings of the body and accepting a pair of electrodes, respectively, is provided, wherein the central body and the capillaries are made of an alumina material or an alumina-based ceramic material and the average diameter of alumina grains in the capillaries ranges from 10 micrometers to 25 micrometers.

The discharge vessel or chamber according to the present invention may be modified, in which the capillaries contain an amount of magnesium oxide, yttrium oxide, zirconium oxide, scandium oxide, lanthanum oxide, or their combination, 1.5 times greater than that of the central body.

Further, according to another embodiment of the present invention, the discharge vessel or chamber may be modified such that the central body and the capillaries are made of an alumina-based composition.

According to another embodiment of the present invention, a method of fabricating a discharge vessel or chamber for a high intensity discharge lamp which has a central body arranged providing a discharge space therein and two capillaries provided for closing off both end openings of the body and accepting a pair of electrodes respectively is provided comprising the steps of: forming the central body and the capillaries from an alumina material or an alumina-based ceramic material; and sintering the central body and at least a portion of each of the capillaries at different temperatures.

BRIEF DESCRIPTION OF THE DRAWINGS

FIG. 6 is an explanatory cross sectional view of an electrode section of a conventional discharge vessel or chamber for a high-intensity discharge lamp.

DESCRIPTION OF THE REFERENCE NUMERALS OR SYMBOLS

1: Discharge vessel or chamber; 2: Central body; 2a: Opening; 2b: Discharge space; 3: Capillary; 5: Central body; 6: Plug; 7: Capillary; 8: Tubular member; 9: Central body; 10: Capillary; 10a: Cover portion; 10b: Capillary portion.

DETAILED DESCRIPTION OF THE INVENTION

Figure 1:
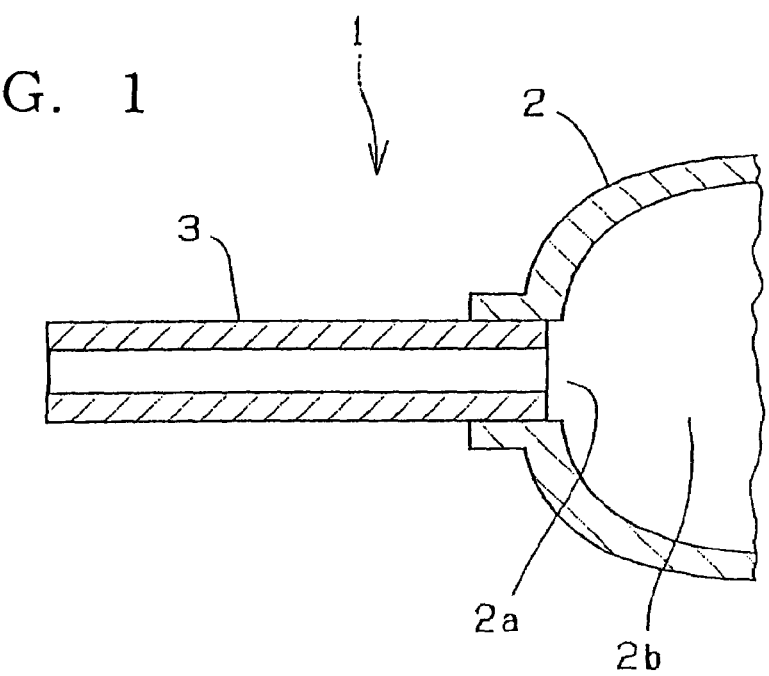
FIG. 1 is an explanatory cross sectional view of an electrode section of a discharge vessel or chamber for a high-intensity discharge lamp showing a first embodiment of the present invention.

Some modes for embodying the present invention will be described in more detail referring to the relevant drawings. FIG. 1 is an explanatory cross sectional view of an electrode section of a discharge vessel or chamber of a high-pressure discharge lamp according to the present invention. The discharge vessel or chamber 1 comprises a central body 2 having an opening 2a provided at each end thereof and a discharge space 2b defined therein and a pair of capillaries 3, each inserted into the opening 2a and having a tubular shape for accepting and holding an electrode material (not shown). The capillary 3 is doped with an amount of magnesium oxide substantially 20 times greater than the amount of magnesium present in the body 2, and the average diameter of alumina grains in the capillary 3 is decreased to be as small as 19 micrometers compared to 32 micrometers in the body 2 to increase the physical strength.

The doping of magnesium oxide permits the average diameter to be decreased, thus improving the physical strength. Accordingly, the generation of cracks during the installation of the electrode material will be prevented. It is hence unnecessary to measure a precise amount of the frit sealer for sealing and filing the gap close to the central body with the frit sealer. It is also unnecessary to increase the thickness of the capillary, thus down-sizing the discharge lamp can be accomplished with much ease.

Figure 2:
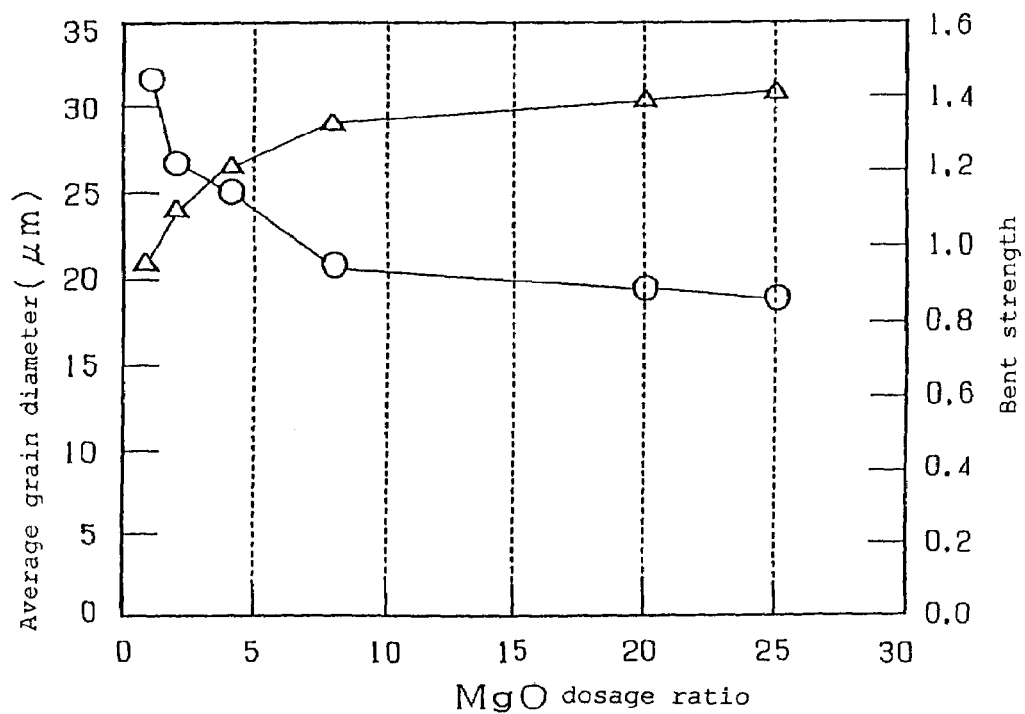
FIG. 2 is a diagram showing the relationship between the amount of magnesium oxide, the average grain diameter, and the physical strength.

The amount of magnesium oxide is not limited to 20 times greater than in the central body but may be within a range of the ratio shown in the diagram of FIG. 2 to maintain the relationship between the amount, the average grain diameter, and the physical strength. At the ratio where the capillary 3 is greater in the amount of magnesium oxide than the central body 2, it can be smaller in the average diameter but higher in the physical strength than the central body 2. If the ratio is not greater than 1.5 times, the physical strength may hardly increase. When the ratio exceeds 25 times, the strength is not increased in proportion with the amount. Hence, the amount is preferably within a range of 1.5 times to 25 times. In FIG. 2, the horizontal axis represents the ratio in the amount of magnesium oxide of the capillary 3 to the central body while the bend strength is a ratio to the central body.

Figure 3:
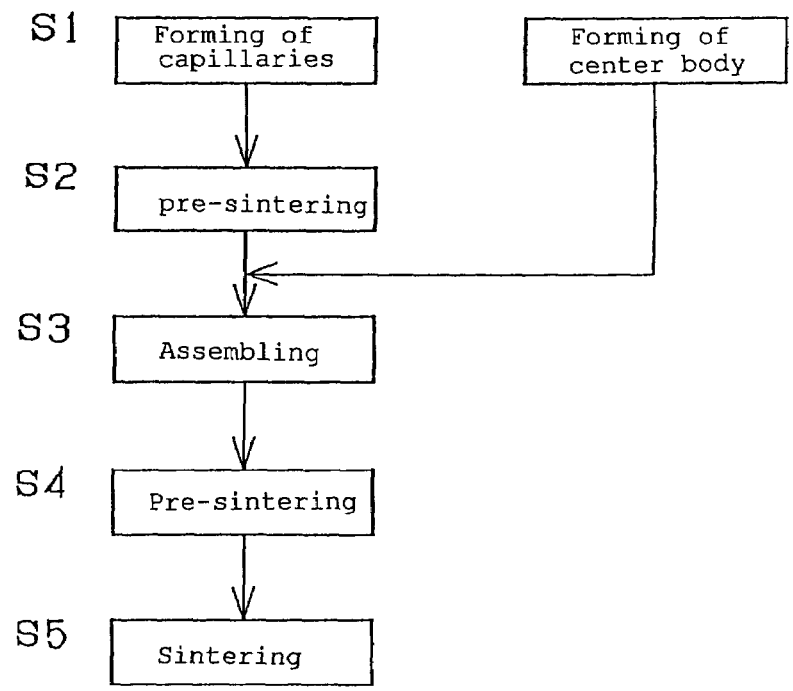
FIG. 3 is a flowchart showing a procedure for fabricating the discharge vessel or chamber shown in FIG. 1.

A method of fabricating the discharge vessel or chamber will now be described referring to the flowchart of the procedure shown in FIG. 3. The central body 2 and the capillary 3 are made of an alumina material or an alumina-based ceramic material. The procedure starts with forming the capillary 3 at Step 1 (S1). During this forming step, an amount of magnesium oxide, e.g. 20 times greater than of the central body 2, is doped. At S2, a green form is pre-baked at 1200° C. for three hours under atmospheric conditions in a pre-sintering step. The pre-sintering is followed by inserting the capillary 3 into the opening 2*a* of the formed separately at S3 central body 2. Then, the assembly is pre-baked at 1200° C. for three hours under atmospheric conditions at S4. Finally, the same is fired at 1850° C. for three hours under a hydrogen atmosphere at S5.

The oxide dopant is not limited to magnesium oxide but may be selected from yttrium oxide, zirconium oxide, scandium oxide, lanthanum oxide, and combinations thereof. Those like magnesium oxide also permit the diameter of grains to be minimized and the physical strength to be increased. The central body 2 and the capillary 3 may not be made of the same composition. Preferably, the capillary 3 may contain a metal material, which is used in the joint of an electrode material, in order to make its characteristic of thermal expansion equal to that of the metal material.

Figure 4:
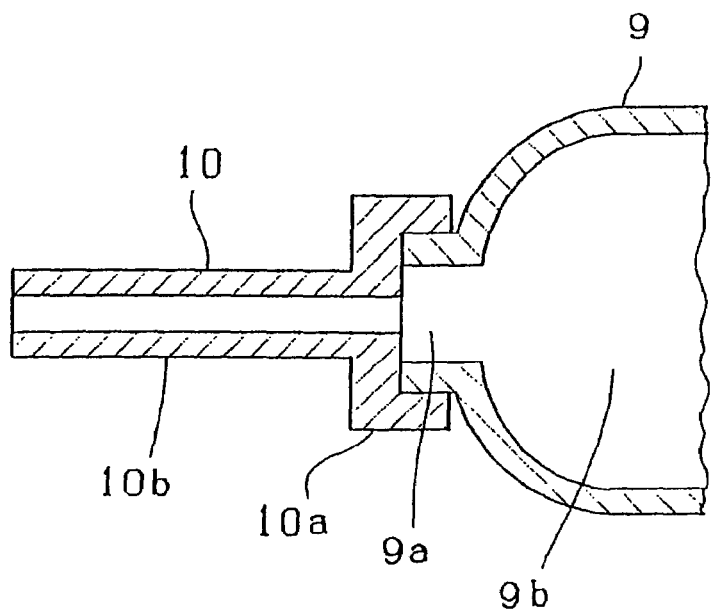
FIG. 4 is an explanatory cross sectional view of an electrode section showing a second embodiment of the present invention.

FIG. 4 is an explanatory cross sectional view of an electrode section showing the second embodiment of the present invention. A central body 9 has an opening 9*a* provided at each of both, left and right (not shown), ends of a discharge space 9*b* thereof. Each of the openings 9*a* of the body 9 is closed off with a capillary 10 in which an electrode material (not shown) is inserted and secured by sealing. The capillary 10 comprises a cover portion 10*a* for closing the opening 9*a* of the body 9 and a capillary portion 10*b* extending outwardly and vertically from the center of the cover portion 10*a*.

A method of fabricating the second embodiment comprises the steps of forming the central body 9 and the capillary 10 of an alumina material or an alumina-based ceramic material and after pre-sintering, sintering the central body 9 at 1850° C. The capillary 10 after being formed is pre-baked at 1200° C. to 1400° C. Then, both are joined to each other and fired at 1700° C. The cover portion 10*a* is inserted into the opening 9*a* and shrunk-on to joint the capillary 10 to the central body 9.

As the sintering temperature of the central body 9 is 1850° C. and that of the capillary 10 is 1700° C., i.e. the central body 9 is fired at the higher temperature, the average diameter of alumina grains in the central body 9 can be increased to as great as 35 micrometers, hence increasing the permeability of light and improving the optical properties. On the other hand, since the capillary 10 is fired at a lower temperature, its average diameter of alumina grains can be as small as 25 micrometers. Using the sintering temperature of 1850° C., the physical strength can be increased, for instance, from 29 kg/cm$^2$ to 38 to 45 kg/cm$^2$. This will prevent the generation of cracks in the frit sealer during the sealing of the electrode. If the capillary 10 has an average diameter greater than 25 micrometers, its physical strength may be declined. When lower than 10 micrometers, the other properties including the resistance to corrosion may be degraded. Preferably, the average diameter ranges from 10 to 25 micrometers.

Figure 5:
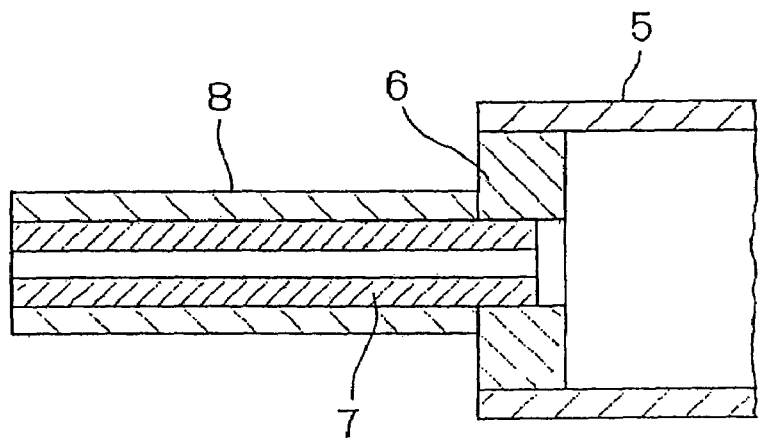
FIG. 5 is an explanatory cross sectional view of an electrode section showing a third embodiment of the present invention.
Figure 5:
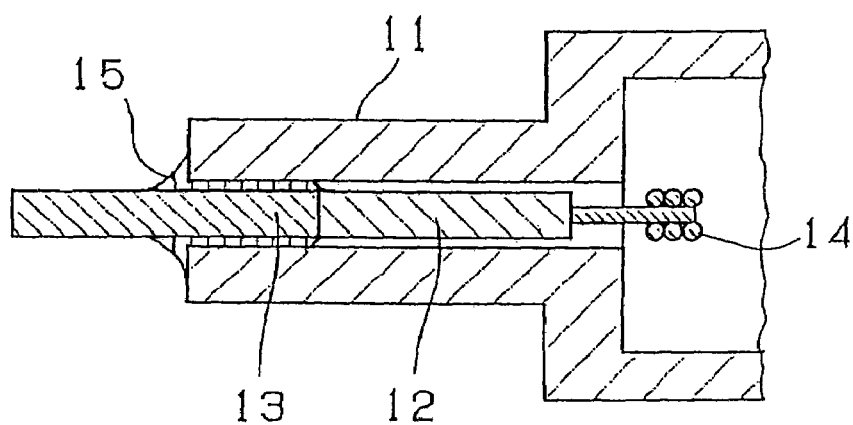

FIG. 5 illustrates a third embodiment of the present invention. A central body 5 of a cylindrical shape has two openings provided in both ends thereof, each the opening closed off with a ring-like plug 6. A capillary 7 is inserted into the center hole of the opening. A tubular member 8 is fitted onto the capillary 7, thus forming a double-capillary structure.

The body 5, the plug 6, and the capillary 7 are assembled and joined by a conventional sintering method, such as a shrink-fit method by sintering at 1850° C., which is based on a difference in the shrinkage. After the sintering step, the tubular member 8 is fit onto the capillary 7 and subjected to a re-sintering process. For example, the tubular member 8 is fired at 1200° C., fit onto the capillary 7, and fired again at 1700° C. to join with the capillary 7 in a shrink-fit manner.

This can increase the physical strength of the capillary, hence permitting a conventional arrangement of the discharge lamp to be increased in the physical strength and preventing the generation of cracks.

As set forth above, according to the present invention, the capillary can be improved in physical strength thus minimizing the generation of cracks during the sealing of the discharge vessel or chamber and also contributing to the down-sizing of the discharge vessel or chamber.

The method of the present invention allows the central body and the capillary to be sintered at different temperatures so that the average diameter of grains in the capillary can be smaller than that in the central body. As a result, the physical strength of the capillary can be increased thus preventing the generation of cracks when the capillary is sealed with the electrode.

What is claimed is:

1. A discharge vessel or chamber for a high-intensity discharge lamp, comprising a central body having a discharge space provided therein, two capillaries closing off respective end openings of said central body and an electrode positioned within each respective one of said capillaries;

wherein said central body and said capillaries comprise an alumina material or an alumina-based ceramic material;

wherein an average diameter of alumina grains in said central body is greater than an average diameter of alumina grains in said capillaries; and wherein said average diameter of alumina grains in said capillaries is in a range of 10 µm to 25 µm.

2. A discharge vessel or chamber for a high-intensity discharge lamp according to claim 1, wherein an amount of magnesium oxide, yttrium oxide, zirconium oxide, scandium oxide, lanthanum oxide, or their combination present in the material of said capillaries is 1.5 times greater than that present in the material of said central body.

3. A discharge vessel or chamber for a high-intensity discharge lamp according to claim 1, wherein said central body and said capillaries comprise an alumina-based composition.

4. A discharge vessel or chamber for a high-intensity discharge lamp, comprising a central body having a discharge space provided therein, two capillaries closing off respective end openings of said central body and an electrode positioned within each respective one of said capillaries;

wherein said central body and said capillaries comprise an alumina material or an alumina-based ceramic material;

wherein said central body and said capillaries are simultaneously sintered;

wherein an average diameter of alumina grains in said central body is greater than an average diameter of alumina rains in said capillaries; and wherein said average diameter of alumina grains in said capillaries is in a range of 10 µm to 25 µm.

5. The discharge vessel or chamber for a high-intensity discharge lamp according to claim 1, wherein a diameter of said discharge space is greater than a diameter of said end openings.

6. The discharge vessel or chamber for a high-intensity discharge lamp according to claim 4, wherein a diameter of each said capillary is substantially constant.

7. The discharge vessel or chamber for a high-intensity discharge lamp according to claim 5, wherein each said capillary is positioned within a respective one of said end openings.

8. The discharge vessel or chamber for a high-intensity discharge lamp according to claim 7, wherein a diameter of said discharge space is greater than a diameter of said end openings.

9. The discharge vessel or chamber for a high intensity discharge lamp according to claim 8, wherein a diameter of each said capillary is substantially constant.

10. The discharge vessel or chamber for a high intensity discharge lamp according to claim 9, wherein each said capillary is positioned within a respective one of said end openings.

* * * * *

UNITED STATES PATENT AND TRADEMARK OFFICE
CERTIFICATE OF CORRECTION

PATENT NO.   : 6,969,951 B1
DATED        : November 29, 2005
INVENTOR(S)  : Sugio Miyazawa and Michio Asai It is certified that error appears in the above-identified patent and that said Letters Patent is hereby corrected as shown below:

Column 6,
Line 3, change "rains" to -- grains --.
Line 11, change "4" to -- 5 --.
Line 14, change "5" to -- 6 --.
Line 18, change "7" to -- 4 --.

Signed and Sealed this

Seventh Day of February, 2006

JON W. DUDAS
*Director of the United States Patent and Trademark Office*